UNITED STATES PATENT OFFICE.

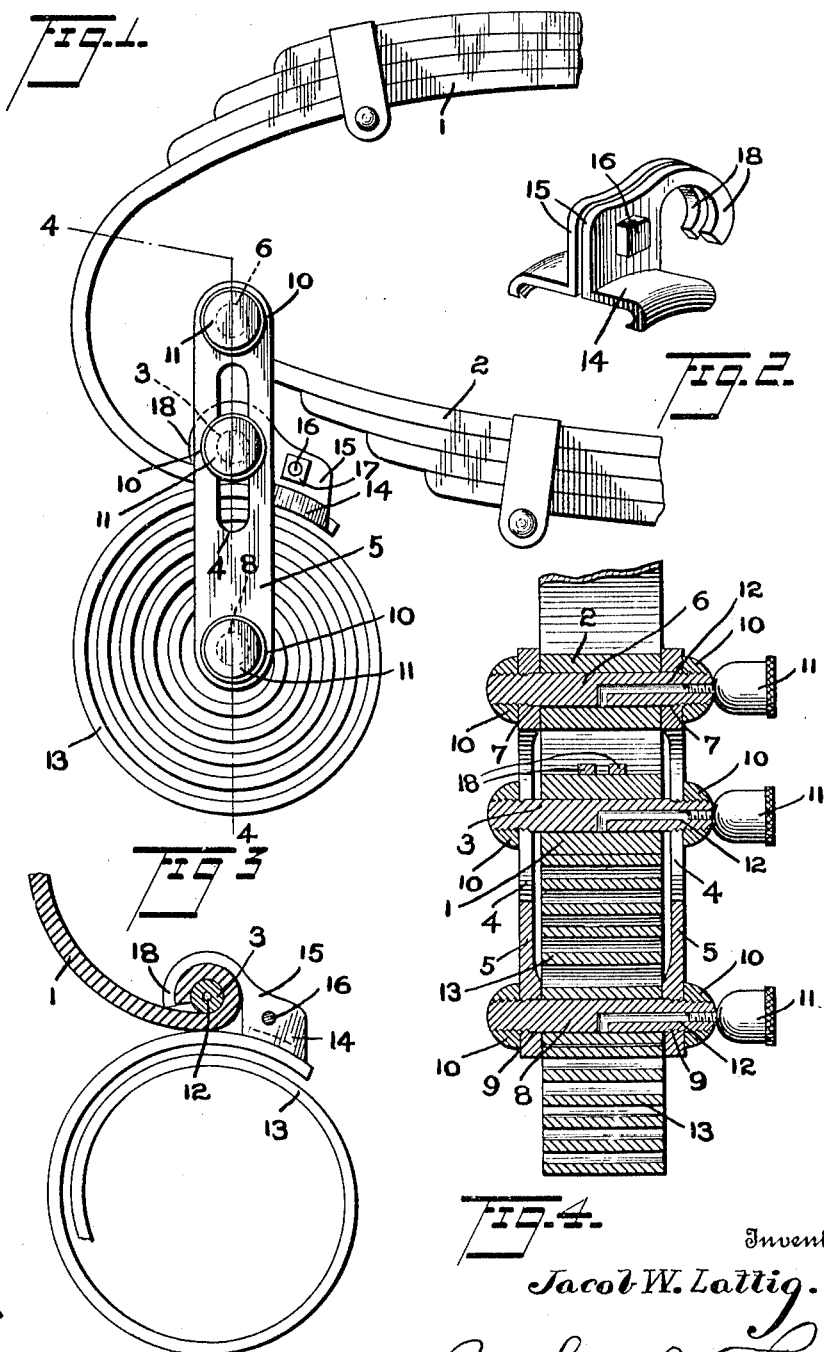

JACOB WILLIAM LATTIG, OF GLENSIDE, PENNSYLVANIA.

SHOCK-ABSORBER.

1,066,508.  Specification of Letters Patent.  Patented July 8, 1913.

Application filed November 18, 1912. Serial No. 731,933.

*To all whom it may concern:*

Be it known that I, JACOB WILLIAM LATTIG, a citizen of the United States, residing at Glenside, in the county of Montgomery and State of Pennsylvania, have invented certain new and useful Improvements in Shock-Absorbers, of which the following is a specification.

My invention relates to improvements in shock absorbers, the object of the invention being to provide an improved shock absorber which may be connected to any ordinary vehicle, and which is especially adapted for connection with the springs of automobiles serving to cushion the rebound of the vehicle as well as the downward movement thereof.

A further object is to provide a shock absorber of this character which is capable of a wide range of adjustment in accordance with the weight of the vehicle, and which is of extremely simple inexpensive construction, strong and durable in use.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements in connection with the upper and lower members of a vehicle spring. Fig. 2 is a perspective view of clamp 14. Fig. 3 is a fragmentary view in vertical longitudinal section illustrating the position of the clamp, and Fig. 4 is a view in longitudinal transverse section on the line 4—4 of Fig. 1.

1 represents the upper spring member and 2 the lower spring member of an ordinary vehicle. These spring members, as is customary, comprise a plurality of springs of different lengths. One of these springs is longer than the others. The longest spring of the upper spring member is coiled about a bolt 3 which projects through longitudinal slots 4 in parallel links 5. The longer spring of the lower spring member 2 coils about a bolt 6 which projects through openings 7 in the upper ends of the links 5. A bolt 8 is projected through openings 9 in the lower ends of the links 5, and while all of these bolts may be secured in various manners, they are preferably screw-threaded at both ends and receive nuts 10. Oil cups 11 are also preferably provided and screwed into the threaded ends of ducts 12 in the bolts, so that these bolts may be lubricated to prevent noise and wear.

A convolute spring 13 is positioned around the lower bolt 8, the smaller convolution of the spring being but slightly larger than the diameter of the bolt. On the outer convolution of the spring 13, my improved clamp 14 is located. This clamp is shown in perspective in Fig. 2, and comprises two members constructed at one end to clamp the side edges of the spring 13, and at their other ends forming perforated ears 15 through which a bolt 16 projects and is secured by a nut 17. These ears 15 have hooks 18 which are adapted to engage over the end of spring 1 which is coiled about bolt 3. In other words, the clamp 14 is so constructed as to receive the spring 13, and when properly positioned on the outer convolution of said spring, is securely clamped by means of the bolt 16 and nut 17. It is, of course, to be understood that in this position, the hooks 18 will be positioned over the end of spring 1, and the bolt 3.

In operation, the downward movement of the vehicle body tends to move the upper portions of the convolutions of spring 13 toward each other and move apart the lower portions of said convolutions. The rebound has the exact opposite tendency because when the spring 1 moves upwardly, it will move the bolt 3 and due to the hooks 18 on clamp 14, will draw the spring 13 upwardly.

By turning the convolute spring 13 to adjust it within the clamp 14, any desired tension may be had in accordance with the weight of the vehicle body. Hence, with my improvements, it is simply necessary to thus adjust the spring 13 in the clamp to secure the desired cushioning effect.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A shock absorber comprising a convolute spring, links at opposite sides of said spring, a bolt projected through said links and through the inner convolution of said spring, a bolt connecting said links outside of the spring, and means secured to move with the outer convolution of the spring and having sliding relation with the links between the said bolts, substantially as described.

2. A shock absorber comprising a convolute spring, links at opposite sides of said spring having longitudinal slots between their ends, a bolt projected through said links and through the inner convolution of the spring, a bolt projected through the slots in the links, a third bolt projected through the links above the slot, and a device connecting the outer convolution with the intermediate bolt, substantially as described.

3. A shock absorber comprising a convolute spring, links at opposite sides of said spring having longitudinal slots between their ends, a bolt projected through said links and through the inner convolution of the spring, a bolt projected through the slots in the links, a third bolt projected through the links above the slot, a clamp secured on the outer convolution of the spring, and means on said clamp engaging the intermediate bolt, substantially as described.

4. A shock absorber comprising a convolute spring, links at opposite sides of said spring having longitudinal slots between their ends, a bolt projected through said links and through the inner convolution of the spring, a bolt projected through the slots in the links, a third bolt projected through the links above the slot, a clamp secured on the outer convolution of the spring, and hooks on said clamp engaging over the intermediate bolt, substantially as described.

5. The combination with upper and lower spring members, of a shock absorber comprising parallel links spaced apart and having longitudinal slots therein, a bolt projected through the upper ends of said links and to which the lower spring member is connected, a bolt mounted to move in the slots in said links and to which the upper spring member is connected, a bolt projected through the lower ends of said links, a convolute spring located between the links and having its inner convolution around the last-mentioned bolt, and means connecting the outer convolution of said spring with the said movable bolt, substantially as described.

6. The combination with upper and lower spring members, of a shock absorber comprising parallel links spaced apart and having longitudinal slots therein, a bolt projected through the upper ends of said links and to which the lower spring member is connected, a bolt mounted to move in the slots in said links and to which the upper spring member is connected, a bolt projected through the lower ends of said links, a convolute spring located between the links and having its inner convolution around the last-mentioned bolt, a clamp adjustably secured on the outer convolution of said spring, and means on said clamp engaging the movable bolt, substantially as described.

In testimony whereof I have signed my name to this specification in the presence of two subscribing witnesses.

JACOB WILLIAM LATTIG.

Witnesses:
R. H. KRENKEL,
CHAS. E. POTTS.

---

Copies of this patent may be obtained for five cents each, by addressing the "Commissioner of Patents, Washington, D. C."